United States Patent [19]
Roslund

[11] Patent Number: 4,766,530
[45] Date of Patent: Aug. 23, 1988

[54] TOKEN PASSING SCHEME FOR A PREDETERMINED CONFIGURATION LOCAL AREA NETWORK

[75] Inventor: Charles J. Roslund, Penn Hills Twp., Allegheny County, Pa.

[73] Assignee: Westinghouse Electric Corp., Pittsburgh, Pa.

[21] Appl. No.: 934,386

[22] Filed: Nov. 24, 1986

[51] Int. Cl.⁴ .......................... G06F 1/00; H04Q 3/00; H04J 3/02
[52] U.S. Cl. ............................... 364/200; 340/825.05; 340/825.5; 370/85; 370/86
[58] Field of Search .................... 364/200; 370/85, 86, 370/89; 340/825.05, 825.5

[56] References Cited

U.S. PATENT DOCUMENTS 4,491,946  1/1985  Kryskow, Jr. et al. ............... 370/89

OTHER PUBLICATIONS

Intel, "iSCB 186/51S Computer Board Hardware Reference Manual", 1984, Intel Corp.
"Token-Passing Bus Access Method and Physical Layer Specifications", IEEE Standards for Local Area Networks, ANSI/IEEE Std 802.4-1985, pp. 15-19 and 42-62.

Primary Examiner—Raulfe B. Zache
Attorney, Agent, or Firm—D. C. Abeles

[57] ABSTRACT

A system having a predetermined number of stations or nodes which all receive the broadcast messages. Each message includes a token value used by each node to access a token ring list. The entry accessed in the list determines whether the node has the token and can immediately transmit or whether the node must continue to wait for another message for a time out period equal to the entry. The token is passed around the ring of nodes and if a node fails, the node following the failed node in the ring will receive the token by default when the time out value retrieved from the token ring list is counted down to zero. Failed nodes that are activated will wait an infinite amount of time to receive a message containing a token value which starts the newly activated node counting down and thus brings the newly activated node back into the network in its proper sequence.

14 Claims, 8 Drawing Sheets

TOKEN PASSING SCHEME FOR A PREDETERMINED CONFIGURATION LOCAL AREA NETWORK

BACKGROUND OF THE INVENTION

1. Field of the Invention

The present invention is directed to a token passing scheme for a local area network having a known number of stations and requiring a deterministic response time and, more particularly, to a system in which the failure of a node or the reactivation of a failed node will not effect system response time or invalidate data on the network.

2. Description of the Related Art

Token passing schemes are used in local area networks where multiple computers or other devices communicate over a common communication media. In order to determine which station or node has the right to transmit, local area networks generally have a token passing scheme whereby a token, granting the right to transmit, is passed from one station to another. Prior art token passing schemes, as typified by the IEEE standard for local area networks entitled "Token-Passing Bus Access Method and Physical Layer Specifications" approved as ANSI/IEEE Standard 802.4-1985, are designed for systems which on start up or restart do not know how many stations exist on the network and do not know the addresses for the existing stations. In such systems, during a start up, a number of collisions between data from different stations occur because some or all of the stations start communicating during the same time period. To straighten out the collisions, collision detection and avoidance hardware is required. In standard token passing systems, the station possessing the token, transmits as much data as desired and then transmits a special frame which transfers the token to the next station. This special token frame wastes time. When a node in the standard system is reactivated after a failure, it starts communicating immediately, causing a collision and requiring that the network restart to determine the new configuration. A restart requires that all stations broadcast their addresses to other stations. The activation of a failed station thus interrupts communications for a considerable period of time and could cause critical time dependent data to be delayed. The standard token passing scheme is not suitable for critical process control situations, such as in a nuclear power plant, where data integrity and timeliness must be maintained.

SUMMARY OF THE INVENTION

It is an object of the present invention to provide a network having a known number of stations.

It is a further object of the present invention to provide a system with a deterministic response time.

It is another object of the present invention to produce a system in which collisions cannot occur and in which collision detection and avoidance hardware is not necessary.

It is an additional object of the present invention to provide a system in which a failure of a node will not effect system response time.

It is also an object of the present invention to provide a local area network in which a reactivated station will not cause an interruption of other data being transmitted on the network.

The above objects are accomplished by a system having a predetermined number of stations or nodes which all receive each broadcast communication. Each message includes a token value used by each node to access a countdown or token ring list. The item accessed in the countdown list determines whether the node has the token and can immediately transmit or whether the node must continue to wait for another message. The token is passed around the ring and, if a node fails, the node following the failed node in the ring will receive the token by default when the countdown value, previously retrieved from the token ring list, reaches zero. Failed nodes that are reactivated will wait an infinite amount of time to receive a message containing a token value which then starts the newly activated node counting down and thus brings the newly activated node back into the network in its proper sequence.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
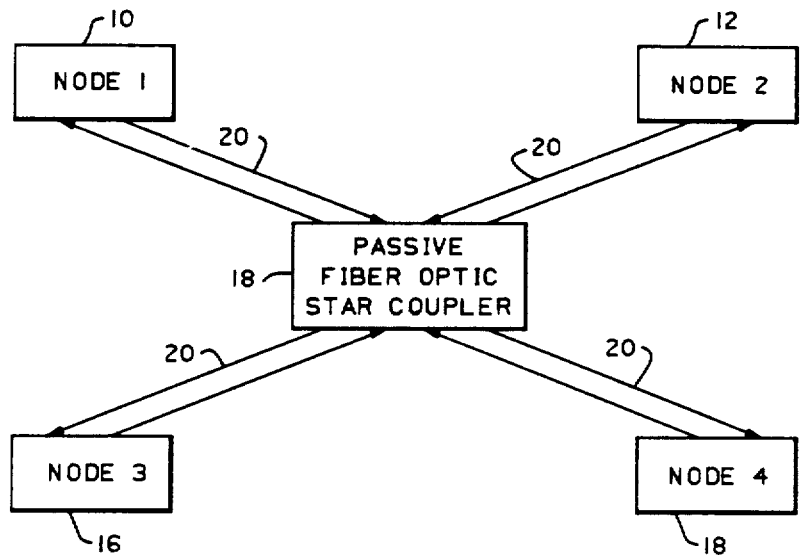
FIG. 1 illustrates typical network typology in a local area network in accordance with the present invention.

A typical four node or four station network in accordance with the present invention is illustrated in FIG. 1 and includes nodes 10-16 which preferably communicate to each other through a passive fiber optic star coupler 18 over fiber optic cables 20. Of course, other media can be used such as coaxial cable, twisted wire pairs, etc. Each fiber optic cable 20 includes a fiber for transmitting and a fiber for receiving, as illustrated by the arrows. Of course, a fiber which is a transmit fiber at one end of the cable 20 is a receive fiber at the other end of the cable 20. A fiber optic network is preferred because it provides electrical isolation between nodes to prevent a network wide failure due to a single electrical failure. The passive fiber optic star coupler 18 is a standard device in the industry and includes no active electrical or electronic components. A suitable coupler 18 is available from Codenoll Technology Corp. of Yonkers, N.Y. In other words, for the coupler 18 to fail, a mechanical failure in the coupling between the fibers is necessary. This is in contrast to the typical prior art system in which the coupler at the center of the network is an active electronic device which detects collisions. The active electronics in the prior art requires collision recovery algorithms.

Figure 2:
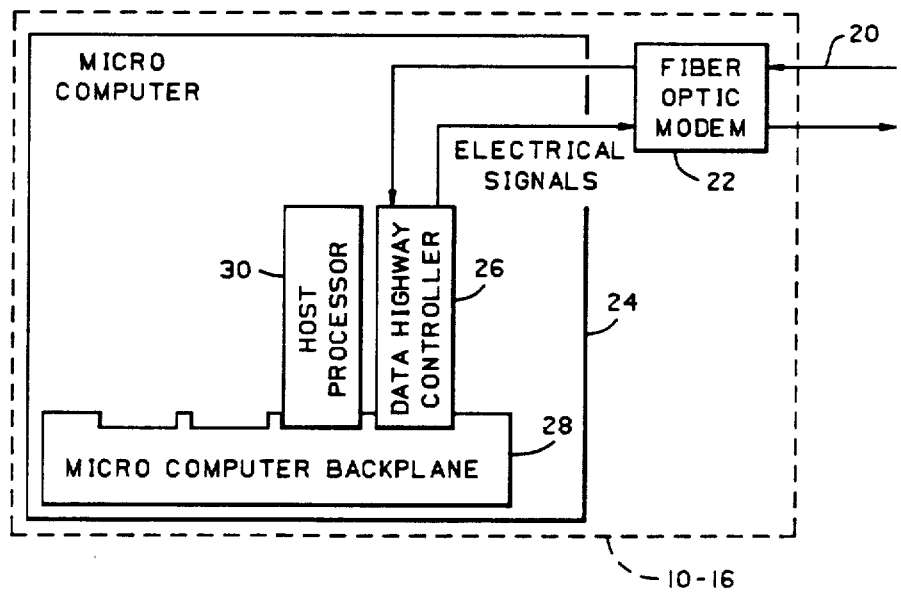
FIG. 2 illustrates the construction of a node in accordance with the present invention.

FIG. 2 illustrates one of the nodes 10-16 of FIG. 1 in greater detail. The optical signals carried by cables 20 are converted into electrical signals by a fiber optic modem 22 and applied to a microcomputer 24 including a data highway controller 26. The modem 22 is available from Codenoll as Model Codenet 3020/3030. The data highway controller 26 also transmits electrical signals to the fiber optic modem 22 which are converted into optical signals to be transmitted over the fiber optic cable 20. The data highway controller 26 communicates through the backplane 28 to a host processor 30. The host processor 30 formulates, analyzes and answers messages transmitted and received over the network.

Figure 3:
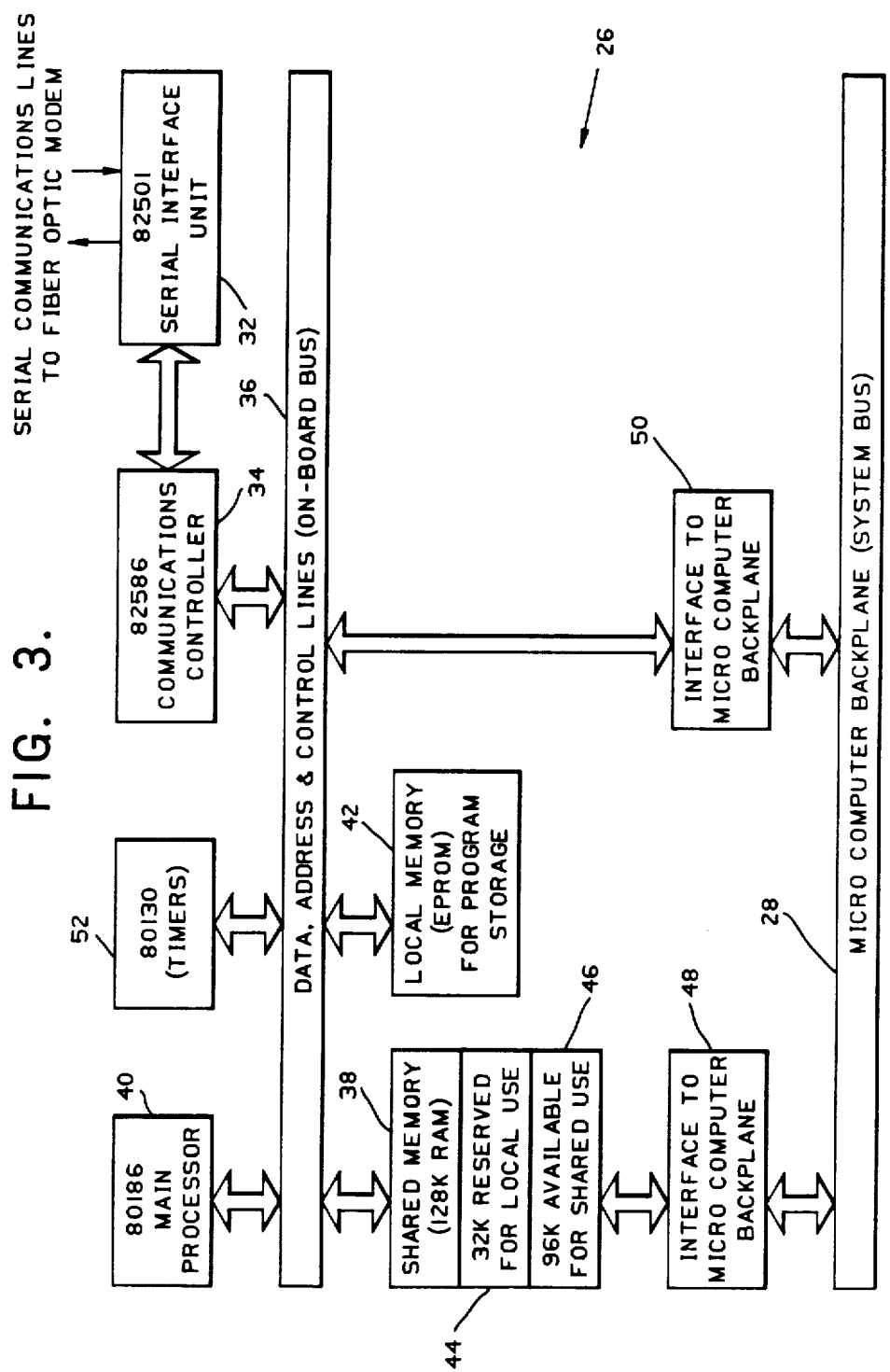
FIG. 3 illustrates the details of a node computer in accordance with the present invention.

FIG. 3 illustrates the structure of the data highway controller 26 in greater detail. The data highway controller 26 receives and transmits messages through a serial interface unit 32 which is controlled by a communications controller 34. The communications controller 34 is a direct memory access type controller which is capable of storing and retrieving messages over bus 36 that are stored in shared memory 38. A main processor 40 under the control of a program stored in local read-only memory 42 examines a message to determine whether this node has the token and if so, indicates to the communications controller 34, if a message is ready for transmission, that the communications controller 34 should retrieve the message from shared memory 38 and transmit same. The random access memory also includes local memory 44 which is used by the main processor 40 during message evaluation and token residence determination. The memory also includes shared memory 46 which is accessible by the host processor 30 through interface 48 over the backplane 28. The main processor 40 has access to the resources on the backplane 28 through interface 50. Timers 52 provide appropriate clock signals for the communications controller 34, interfaces 48 and 50 and main processor 40. The data highway controller 26 of FIG. 3 is available from Intel Corp. of Santa Clara, Calif. as a single board computer model iSBC 186/51S and provides a standard ethernet interface. A person of ordinary skill in the art would be able to program and operate such an Intel computer in accordance with the flowcharts described herein by using an iSBC 186/51S hardware reference manual available from Intel.

Figure 4:
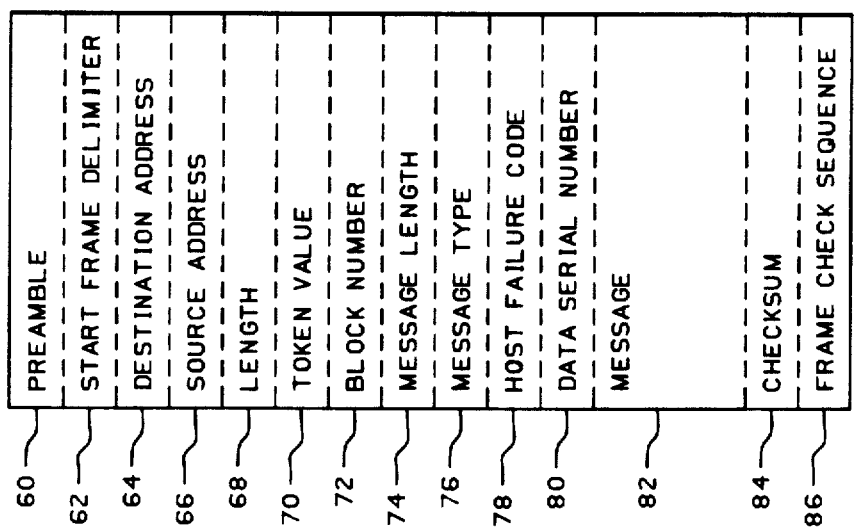
FIG. 4 illustrates the frame structure of a data frame transmitted and received over the system of FIGS. 1-3.

The present invention transmits data in a unit designated as a frame, as illustrated in FIG. 4. Each frame includes a standard preamble 60 of 56 alternating bits followed by a start frame delimiter 62 with the standard pattern such as "10101011". The start frame delimiter 62 is followed by a node destination address 64 which is a sixteen bit address which can indicate the node to which the message is applicable and a 16 bit node source address 66. The destination address in the present invention, since all messages are broadcast to all nodes, is always 0FFFF hexidecimal. The node source address 66 indicates the node that transmitted the message. Following the source address 66 is a length field 68 which indicates the length of the message blocks. After the length 68 comes the token value 70 which is used by each node to determine whether the node has the token. The present invention is particularly different from prior art standard token passing schemes in that the token value is transmitted with each message and not as a separate message. Thus, even though a message may be travelling from node 1 to node 3, because all messages are received by each node, the token can be passed to another node (node 2) even though the message is not used by the other node (node 2). Following the token value 70 is a block number 72 which indicates which block of the message is presently being transmitted. The length 74 of the message is indicated in bytes and includes the message length word as well as the check sum at the end of the message. Following the message length 74 is a message type 76 and a host failure code 78. A data serial number 80 follows the host failure code 78 and is followed by the message 82 which can be any length, within limits specified by the hardware (iSBC 186/51S) and the standard ethernet protocol. The message is followed by a checksum 84 which is the checksum of the fields starting with the message length 74 and ending with the message 82. A frame check sequence 86 follows the checksum and is a 32 bit cyclic redundancy code polynomial used to ensure that the entire frame is correct.

Figure 5:
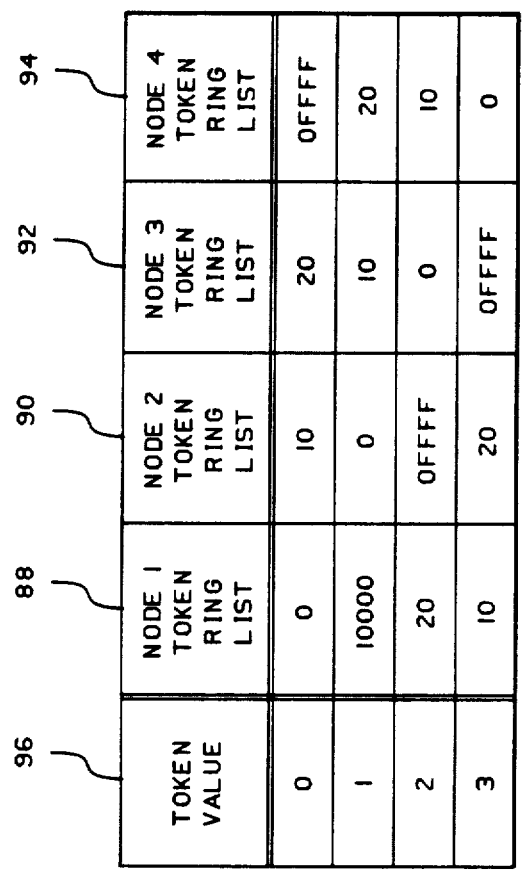
FIG. 5 is an example of the token ring lists in a four node system, as depicted in FIG. 1.

As discussed earlier, the token carries with it the right to transmit on the network and each message transmitted on the highway and received by all nodes simultaneously contains a new token value. The token value is a whole number in the range of 0 through 0FFFF hexidecimal. A token ring list is used in the present invention to determine the order in which the token moves from node to node and the time allowed for each node to transmit. The node that currently has the token has exclusive access to the network. Each node includes a token ring list 88, 90, 92 and 94, as illustrated in FIG. 5, which is a list of countdown values that correspond to lengths of time the node will wait before assuming that a predecessor node in the token ring has failed or lost a message. The token value 96 is used as an index into each list for each node to obtain a new countdown value whenever a new token value is received in a message. A token ring list value of 0, as occurs in the first item in the node 1 token ring list, indicates that node 1 has the token and can proceed to transmit over the network. A token ring list value of 0FFFF hexidecimal indicates that the node should wait forever for another message. An example of the infinite wait token ring list value is the third item in the node 2 token ring list.

The network represented by FIG. 5 corresponds to the physical network, illustrated in FIG. 1 and includes four nodes, 1-4. Node 1 is the master node and has the responsibility for starting the token passing around the ring. When the system is initialized, the token value in the master node is one and, as a result, when node 1 accesses its token ring list with a value of one, the token ring list value or count is 10,000. Node 1 will decrement this value by one at the specified clockrate until it is decremented to zero. When node 1 detects a count of zero, node 1 will proceed to transmit. The token value in the message transmitted by node 1 incremented to a value of one. Nodes 2-4 all receive the message transmitted by node 1. When node 3 receives the message containing a token value of 1, node 3 will access its token ring list and discover a countdown value of 10 milliseconds. In this embodiment and for purposes of explanation, milliseconds is used as the time unit, however, any desired time unit could be used. Node 3 will store this value in its countdown counter or timer 52 and begin counting down. If the countdown value reaches zero, node 3 will recognize that node 2 has failed since a message resetting the countdown value has not been received. Node 3 will increment the token value to the next zero countdown value in its token ring list (entry 3) whenever it times out, obtaining a token value of 2. A zero countdown value indicates to node 3 that it has the token and node 3 will proceed to transmit a message including an incremented token value of 3. Node 4 will use the token value of 3 in the message from node 3 to examine its token ring list and discover a zero indicating that node 4 has the token and the right to transmit. In the meantime, if node 2 has been fixed, when node 2 is reactivated, because it is not a master node, it is initiated with a countdown value of 0FFFF hexidecimal indicating that the node should countdown forever, that is, wait forever before transmitting. When node 4 transmits a message with a token value of 0, of course, node 1 will transmit next but, at the same time, node 2 will access its token ring list with the token value 0 and obtain a countdown value of 10 milliseconds. That is, node 2 will be reset to wait for 10 milliseconds before transmitting a new message containing a new token value if node 1 fails. Whenever any node, except the master node, transmits a message with an updated token value, the node sets its own downcount counter to 0FFFF hexidecimal so that it will wait forever for a new message with a new token value. This prevents a node that just finished transmitting from again transmitting before another node transmits. That is, it prevents a single node from monopolizing the network after it has completed transmitting. If a node has several blocks of data to transmit, a token value of 0FFFF hexidecimal can be transmitted. This value indicates that the other nodes should continue counting from their present countdown values.

As can be seen from the above discussion, each node will wait a specific amount of time before taking the token by default. This period is equal to the amount of time it takes for each predecessor node in the system to transmit its token. The worst case response time for the system illustrated by FIG. 5, is 40 milliseconds which is equal to a wait of 10 milliseconds for node 1 to pass the token to node 2, a wait of 10 milliseconds for node 2 to pass the token to node 3, a wait of 10 milliseconds for node 3 to pass the token to node 4 and a wait of 10 milliseconds for node 4 to pass the token to node 1. In a system such as that depicted by FIG. 5, the countdown values in the token ring list should be chosen so that the successor node will wait slightly longer than its predecessor actually takes to transmit the token before taking the token by default. This will assure that the response time of the network is approximately the same with and without failed nodes. The system of FIG. 5 assumes a normal response time for each node of 9 milliseconds and 1 millisecond is added to ensure that each successor node will wait longer than the normal transmission time. Countdown values in the token ring list should also be cumulative. In the example of FIG. 5, for a token value of 1, node 4 waits 20 milliseconds before taking the token by default or time out when no other messages are transmitted. The 20 millisecond wait for node 4 is determined by summing the countdown times for the normal path of the token to each node until it reaches node 4. When the token value is 1, node 2 has the token and the normal path is then node 2 to node 3, for which node 3 waits 10 milliseconds, and then node 3 to node 4, for which node 4 waits 10 milliseconds, for a total of 20 milliseconds.

In the example of FIG. 5, node 1 has been designated the master node. This is apparent from the token ring list in that the list for node 1 does not contain a value of 0FFFF hexidecimal. As a result, node 1 will continually attempt to restart the token, even if no other nodes are active every 10,000 milliseconds. It is possible, of course, to designate other nodes in the network as alternate or secondary masters to allow for start up of the network, in the event of the failure of the master node. This could be accomplished by having another node in the network, for example, node 3, not contain a value of 0FFFF hexidecimal in its token ring list but contain, for example, a value higher than the corresponding value of the master node of, for example, 20,000 milliseconds. If node 3, in its fourth entry, contained a value of 20,000 milliseconds, node 3 would attempt to restart the token within 20,000 milliseconds, even if the master node (node 1) is not functioning.

It is also possible to allow one or more nodes in the system to have a faster response time than any of the other nodes. For example, if it is necessary that node 2 transmit twice as often as any of the other nodes in the system of FIG. 5, two zeros could be provided in the node 2 token ring list.

Figure 6:
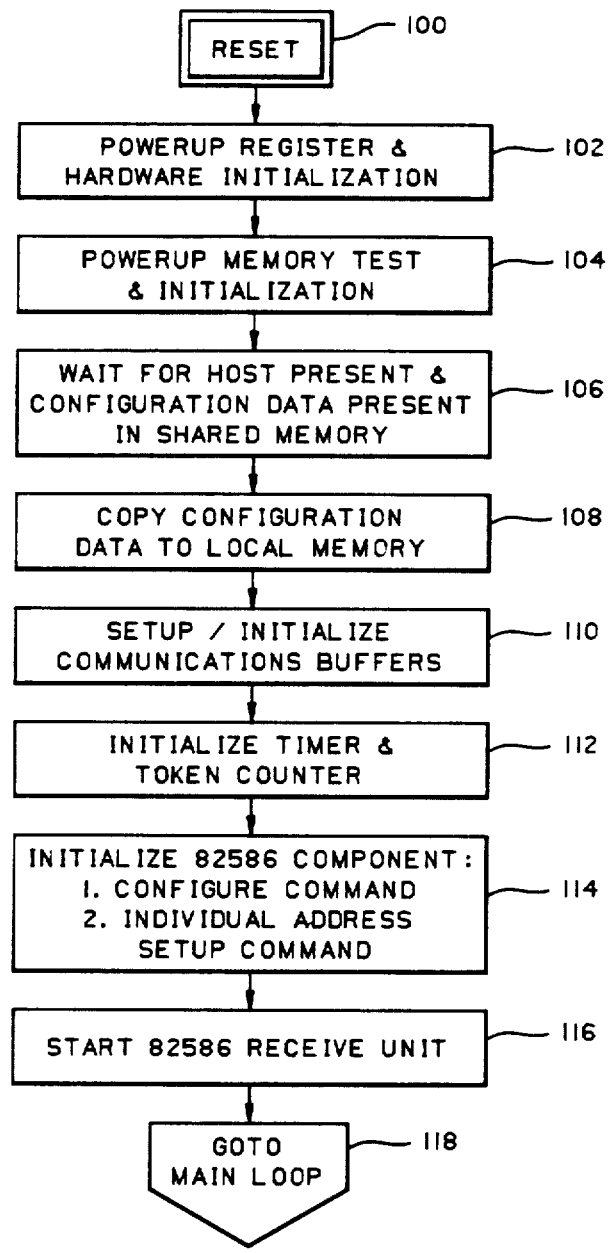
FIG. 6 is a flowchart of the initialization routine of a system in accordance with the present invention.

FIG. 6 illustrates the initialization routine for the network according to the present invention which starts from a reset 100. After the reset 100, a normal register initialization and hardware initialization occurs 102 followed by memory tests and initialization 104 of same. The data highway controller 26 then waits for the host computer 30 to indicate that it is present and load the network configuration data into the shared memory. The network configuration data for each node includes the token ring list, this nodes address and the number and size of the communication buffers needed. The main processor 40 then copies 108 the configuration data from shared memory 46 into local memory 44. The main processor 40 then sets up and initializes 110 its communications buffers, that is, the processor 40 sets aside rotating receive buffers for incoming messages, a buffer for messages received from each of the known nodes in the system and also sets aside a transmit buffer in shared memory 38. Next, the processor 40 initializes 112 the countdown timer as one of the timers 52 and sets the token value and token counter to the value specified in the configuration data. If the node is the a master node, the token counter is set to 10,000 (in the example of FIG. 5) which will cause the master node to transmit when the corresponding item in the token ring list is retrieved. If the node is not a master node, the token counter is set to a value that causes the infinite wait token ring list value to be read. That is, in the example of FIG. 5, the token value is set to one for node 1 and set to 2 for node 2. Next, the communications controller 34 in the data highway controller 26 is initialized 114 by storing a configure command in the shared memory accessible by the communications controller 34 and then loading the individual address set up command in the shared memory. Next, the communications controller 54 receive unit is started 116. The steps discussed above, starting with the reset 100, are well known initialization type steps, the details of which one of ordinary skill in the art can provide upon reviewing the hardware manual previously mentioned. Once the initialization procedure is completed, the system transfers control to the main loop of FIG. 7.

The primary function of the main loop is to determine whether a message has been received from the network and to cause a message to be transmitted if the token has been transferred to the node. First, the main processor determines 122 (FIG. 7A) whether a message has been received over the network and, if so, acknowledges 124

Figure 7A:
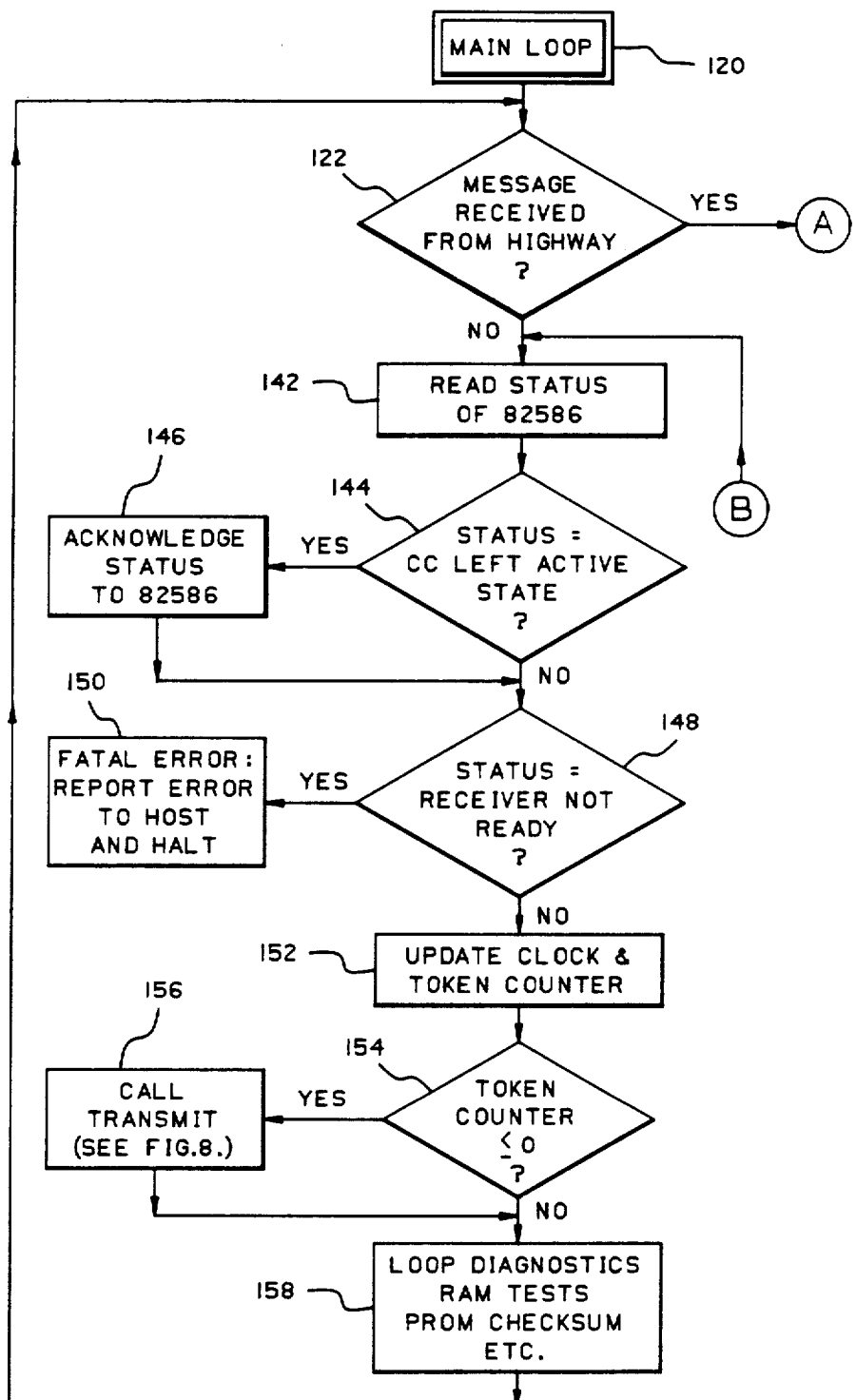
FIGS. 7A and 7B illustrate the main loop of the process of the present invention.
Figure 7B:
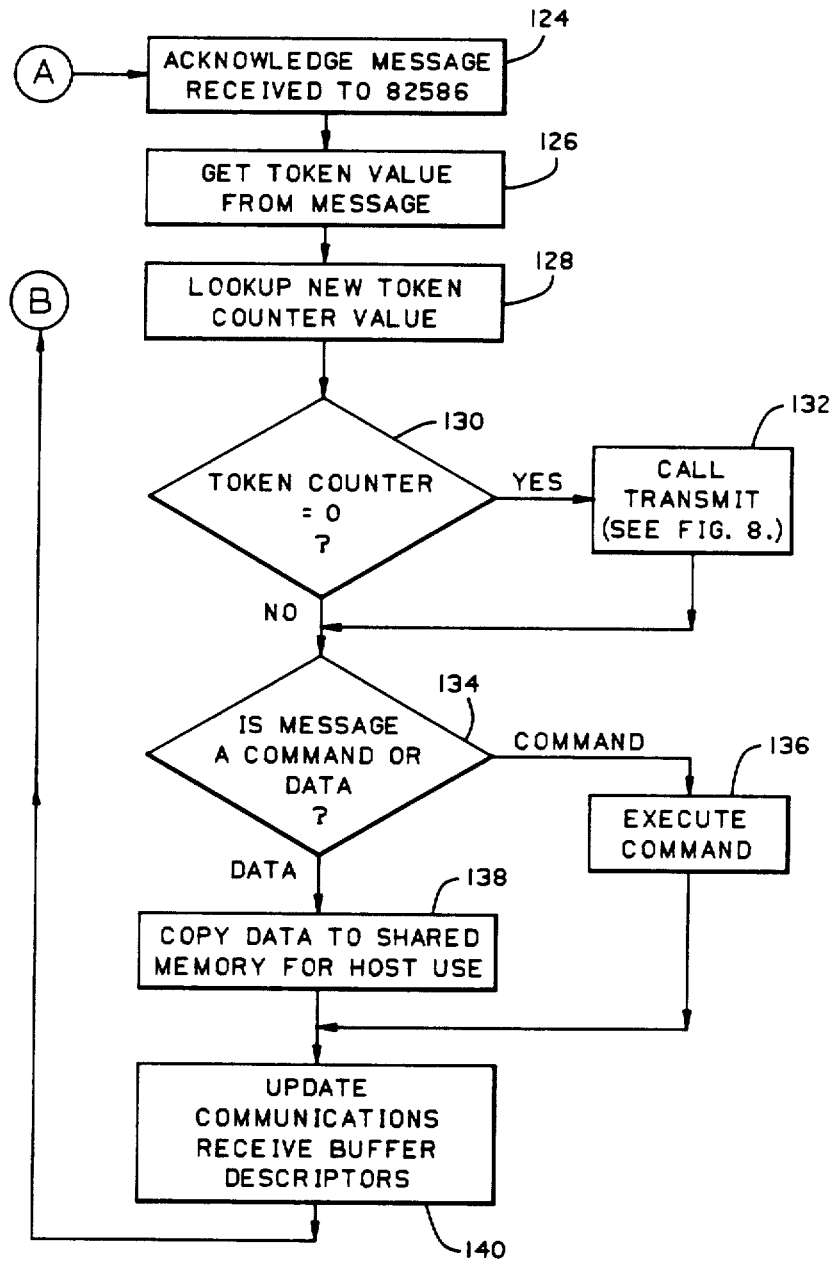

(FIG. 7B) the receipt of the message to the communications controller 34. The receipt of a message is determined by accessing a known location in shared memory 38 that is loaded by the controller 34 and examining the contents of the location for a message received indicator. Acknowledgement is performed by loading the known memory location with an acknowledge indicator. The processor 40 then obtains 126 the token value in the message and looks up 128 a new token counter value or time out value in the token ring list. If the token counter is zero 130, the system calls 132 the transmit subroutine. If the token counter is not zero or after a transmit has occurred, the processor determines 134 whether the message received is a command or data. If it is a command, the command, which is application specific, is executed. An example of a command might be to download a new token ring list from the master terminal whenever a new node is being added to the network and the command could indicate that such a task is necessary. If the message is data, the data is copied 138 to the shared memory 46 and made available to the host processor 30. Next, the communication receiver buffer descriptors are updated 140 to indicate that the receive buffer is free for another message. If a message is not received from the network, the status of the communications controller is read 142 (FIG. 7A). If the status of the communications controller is "Left Active State" 144, the status is acknowledged 146 to the communications controller 34. Next, the processor 40 determines 148 whether the status is a receiver not ready status and if so, a fatal error has occurred 150 for which a report must be made to the host computer 30 followed by a halt. If the receiver is ready, the clock and token counter are updated 152. That is, the on board clock is examined and compared to the last clock value saved. The difference in milliseconds is used to decrement the token counter or time out value which is used to determine whether the node has the token. If the token counter is less than or equal to zero 154, the transmit subroutine is called 156. After the examination of the token counter, loop diagnostics are performed 158 so that the data highway controller 26 is continuously checking itself to ensure correct functioning.

Figure 8:
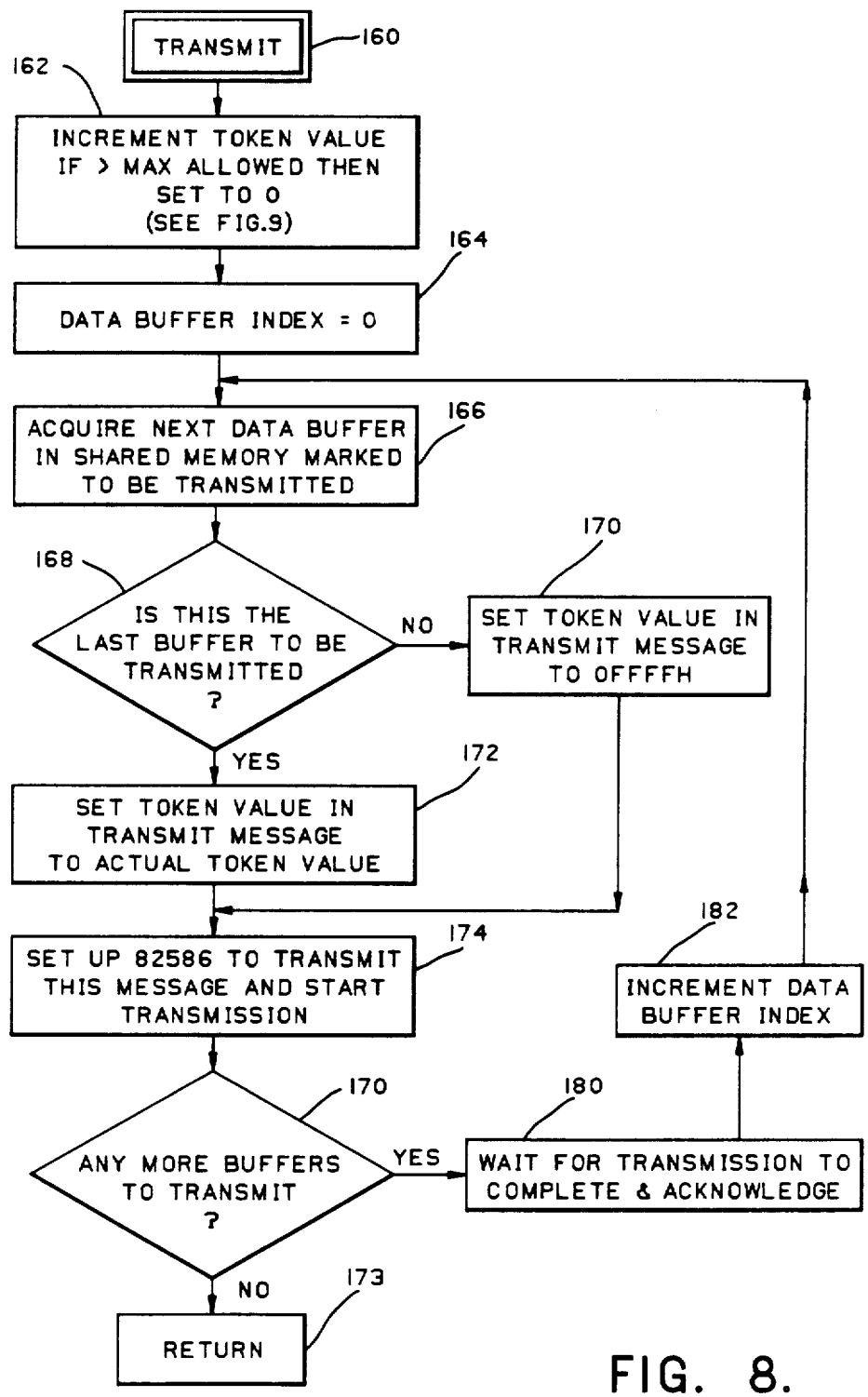
FIG. 8 is a flowchart of a transmit routine in accordance with the present invention.

When the transmit routine is called, in blocks 132 or 156 of FIG. 7, the routine illustrated in FIG. 8 is executed. First, the token value is incremented and compared 162 to the maximum value. If the token value is greater than the maximum value, the token value is set to zero. For example, in FIG. 5, if the token value is 4 after incrementing, the token value is set to zero. The data buffer index is set to zero. This index points to the next buffer which should be transmitted. The buffer indicated by the buffer index is acquired from shared memory and marked for transmission. Next, the processor 40 determines 168 whether this is the last buffer to be transmitted. If not, the token value is set 170 to 0FFFF hexidecimal. As previously discussed, this value indicates to the other nodes in the system that they should continue counting down with their present countdown values. If the current buffer, indicated by the data buffer index, is the last buffer to be transmitted, the token value is loaded 172 into the appropriate portion of the frame. Next, the processor 40 loads 174 the appropriate location in shared memory 38 with a transmit command. As previously discussed, the communications controller 34 is a direct memory access type controller and scans the appropriate location of shared memory 38 to determine if a transmit command is present. When the communications controller 34 detects a transmit command, the communications controller retrieves the appropriate message data frame from the shared memory 38 and transmits same through the serial interface unit 32. In the meantime, the main processor 40 determines 176 whether there are any more buffers to be transmitted. If not, the controller returns 178 to the main loop of FIG. 7. If additional buffers are to be transmitted, the processor 40 waits for a transmission complete status. The processor 40 then initiates a Transmission Complete Acknowledge. When the transmission has been acknowledged, the data buffer index is incremented 182 and the next buffer is sent in the same manner.

Figure 9:
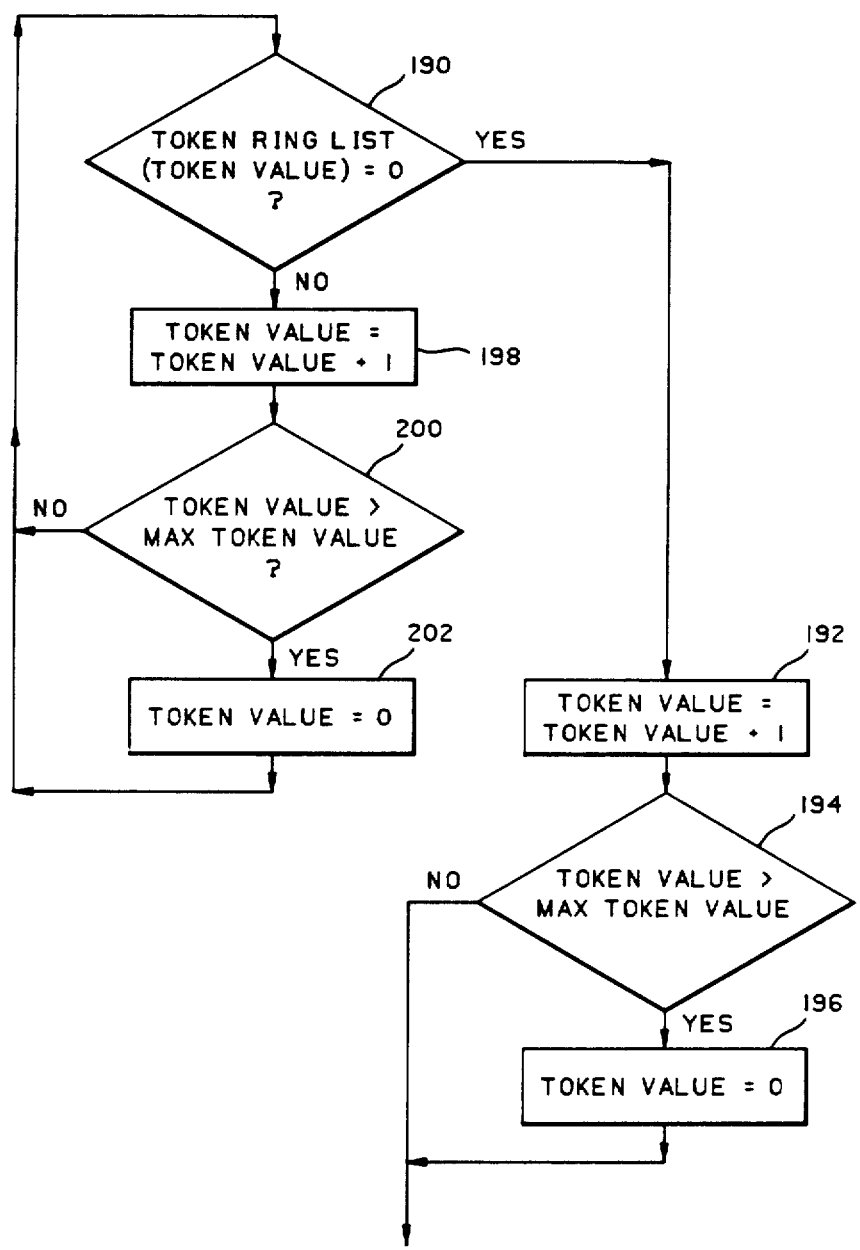
FIG. 9 illustrates the token value increment process of FIG. 8.

FIG. 9 is a flowchart of the function of block 162 in FIG. 8 expanded with more detail. Whenever the transmit routine is called based on the token counter (time out value) equaling zero, the processor must move the token value forward to the correct value for the current node so that the next message will have a token value which will designate the next succeeding node for transmission. That is, if nodes 2 and 3 in the example of FIG. 5 have failed and node 4 reaches a zero time out value, the token value must be updated to reflect that node 1 receives the token when node 4 is finished transmitting. The procedure of FIG. 9 illustrates the process of updating the token value in this situation. First, the token ring list entry corresponding to the token value is examined 190 to determine whether it is zero. If it is zero, then one or more of the prior nodes have not failed and the token value is incremented 192 in a normal fashion. The token value is then compared 194 with the maximum token value and set 196 to zero if greater than the maximum token value. If the entry in the token ring list for the token value is not equal to zero, then one or more of the preceding nodes have failed and a loop is entered which hunts for a token ring list entry of zero. After a token ring list entry that is not zero is encountered, the token value is incremented 198 after which it is compared 200 to determine whether it is maximum. If it is the maximum, the token value is set 202 to zero. The loop then returns to examine the token ring list again. This loop will continue to be processed until the token ring list entry for the current token value is equal to zero, at which point the proper token value has been reached for the current node. The token value will then be incremented 192 in accordance with the normal process.

The present invention should preferably be implemented in a language such as PL/M-86, no operating system should be provided and interrupts must be avoided. The present invention is particularly applicable to real time systems where a guaranteed response time is required and in which this guaranteed response time must be unaffected by system failures. Typical applications might be nuclear power plants and bank teller networks where a fixed response time is required because of physical requirements or based on the need for customer satisfaction, respectively. If the invention is used in an office communication system in which the number and locations of nodes can change, it is possible to download the current configuration from the master node to all nodes by having a specialized message for that purpose. Such a downloading could also occur in emergency type situations where communication with less than all nodes is, for some reason, necessary.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art it is not desired to limit the invention to the exact construction and operation illustrated and described, and accordingly, all suitable modifications and equivalents may be resorted to, falling within the scope of the invention.

What is claimed is:

1. A token passing method for a communications network carrying a message, including a token value, said method comprising the steps of:
   a. accessing a token ring list using the token value as an index when the message is received over the network;
   b. transmitting a new message over the network including an updated token value if an entry in the token ring list corresponding to the token value is equal to a predetermined value; and
   c. awaiting another message if the entry is not equal to the predetermined value.

2. A method as recited in claim 1, wherein the entry is a countdown value and step c comprises:
   c1. determining whether another message has been received;
   c2. decrementing the countdown value if another message has not been received;
   c3. determining whether the countdown value has reached the predetermined value; and
   c4. transmitting the new message including the updated token value if the countdown value has reached the predetermined value.

3. A method as recited in claim 2, wherein step c4. includes:
   i. determining whether the token ring list entry corresponding to the token value is equal to the predetermined value;
   ii. incrementing the poken value and returning to step i. if the entry is not equal to the predetermined value; and
   iii. updating the token value.

4. A token passing method in a nuclear power plant communication network, said method comprising the steps of:
   a. accessing a predetermined token ring list using a token value contained in each message, the token value being used as an index into the list;
   b. transmitting a new message over the network including an updated token value if an entry in the list corresponding to the token value is equal to a predetermined value;
   c. determining if another message has been received over the network if the entry is not equal to the predetermined value; and
   d. counting down for a countdown value equal to the entry and transmitting the new message over the network if the countdown value has been counted down to the predetermined value and if the entry is not equal to the predetermined value.

5. A token passing method for communication nodes, comprising the steps of:
   a. examining a received message received by one of the communication nodes and including a token value; and
   b. transmitting, by the one of the communication nodes, a transmit message including an updated token value when the token value is a predetermined value or when a time out value has been counted, where each node has a different time out value.

6. A method as recited in claim 5, further including a step of setting the time out value for a node to slightly greater than a transmission time of a predecessor node.

7. A method as recited in claim 6, further including a step of setting the updated token value to designate a successor node.

8. A method as recited in claim 7, wherein steps a. and b. respectively include transmitting messages to all nodes and receiving messages from all nodes.

9. A method as recited in claim 8, further including a step of using each message to update the time out value.

10. A communications network, comprising:
    a communications media; and
    communication nodes coupled to said media, each of said nodes comprising:
      transmit/receive means, coupled to said media, for receiving a first message containing a token having a first value and transmitting a second message containing the token having a second value; and
      determination means, coupled to said transmit/receive means, for accessing a predetermined token ring list using the first token value to obtain a token ring list entry, comparing the entry to a predetermined value, and updating the token to the second value and transmitting the second message if the entry is equal to the predetermined value.

11. A network as recited in claim 10, wherein said determination means includes time out means for transmitting the second message after a time out period equal to the entry.

12. A network as recited in claim 11, wherein said transmit/receive means of all nodes receive the first and second messages and said determination means of all nodes have token ring lists with corresponding entries not equal to each other.

13. A network as recited in claim 12, wherein said determination means updates the time out period each time a message is received using the entry.

14. A nuclear power plant communications network, comprising:
    a communications media; and
    communication nodes coupled to said media, each of said nodes comprising:
      a communication controller coupled to said media, and receiving from and transmitting messages to all of said nodes over said media, each message having a token value; and
      a computer, coupled to said communication controller including a token ring list containing time out values, the token value being used as an index into the list to obtain a corresponding time out value entry, the computer authorizing transmission of a message when the entry equals zero, the computer counting down for the time out value when the entry is not equal to zero and transmitting a message when the counted down time out value equals zero.

* * * * *